United States Patent
Schwab et al.

(10) Patent No.: US 8,362,095 B2
(45) Date of Patent: Jan. 29, 2013

(54) DEFOAMING OF IONIC LIQUIDS

(75) Inventors: Peter Schwab, Essen (DE); Christian Mund, Essen (DE); Kerstin Kugel, Velbert (DE); Hans-Juergen Koehle, Mainhausen (DE); Rene Haensel, Dorsten (DE)

(73) Assignee: Evonik Goldschmidt GmbH, Essen (DE)

( * ) Notice: Subject to any disclaimer, the term of this patent is extended or adjusted under 35 U.S.C. 154(b) by 306 days.

(21) Appl. No.: 12/364,929

(22) Filed: Feb. 3, 2009

(65) Prior Publication Data

US 2010/0084597 A1     Apr. 8, 2010

(30) Foreign Application Priority Data

Feb. 5, 2008   (DE) .................. 10 2008 007 730

(51) Int. Cl.
*B01D 19/04*   (2006.01)
(52) U.S. Cl. ............ 516/124; 252/8.86; 252/73; 252/79
(58) Field of Classification Search ............. 516/124; 252/8.86, 73, 79
See application file for complete search history.

(56) References Cited

U.S. PATENT DOCUMENTS

| 6,001,887 A * | 12/1999 | Keup et al. ............. 516/118 |
| 2006/0094617 A1 | 5/2006 | Price et al. |
| 2006/0094620 A1 * | 5/2006 | Jordan et al. ............ 510/286 |

FOREIGN PATENT DOCUMENTS

| DE | 2829906 | 3/1979 |
| DE | 10353856 | 6/2005 |
| EP | 1672051 | 6/2006 |
| WO | WO 2007/010845 | 1/2007 |
| WO | WO 2007/077048 | 7/2007 |

OTHER PUBLICATIONS

International Search Report for EP 08171594 dated Jul. 19, 2011.

* cited by examiner

*Primary Examiner* — Ling Choi
*Assistant Examiner* — Chun-Cheng Wang
(74) *Attorney, Agent, or Firm* — Frommer Lawrence & Haug LLP

(57) ABSTRACT

The invention relates to the defoaming of ionic liquids and also to compositions comprising at least one ionic liquid and at least one antifoam and, if appropriate, a solvent and/or further auxiliaries or additives.

11 Claims, No Drawings

DEFOAMING OF IONIC LIQUIDS

This application claims benefit under 35 U.S.C. 119(a) of German patent application DE 102008007730.5, filed on 5 Feb. 2008.

Any foregoing applications, including German patent application DE 102008007730.5, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

BACKGROUND

Foams in aqueous systems are formed because amphiphilic and thus surface-active surfactant molecules accumulate at the water/gas interface and lead to a decrease in the surface tension. Owing to the resulting decreased surface tension, a new water/gas interface (=foam) is easily created. In addition, the foam formed in an aqueous system is stabilized by the surfactants by means of various mechanisms.

Mention may be made here by way of example of the Gibbs-Maragoni effect which is known to those skilled in the art and also the electrostatic or steric repulsion of surfactant molecules at reduced foam lamella thickness. The antifoams developed for these aqueous surfactant systems influence these stabilization mechanisms in various ways in which, for example, the displacement and deactivation of the surfactant molecules at the water/gas interface plays a role.

In contrast to aqueous systems which are to be regarded as mostly non-ionic, surfactant-stabilized systems the stabilization of the foam of an ionic liquid occurs by mechanisms different from those operating in an aqueous system. It should, in particular, instead resemble the stabilization of the foams of organic nonaqueous oils (e.g. diesel oil) which occurs by means of impurities having nonsurfactant character.

Ionic liquids are used and have been proposed for numerous applications in which gases, in particular air or nitrogen and other industrial gases, and also, for example, steam are introduced under shear. This results in foam formation which in many cases has adverse effects on the application (e.g. material wear due to increased friction). As such, a need still exists in the art to reduce or eliminate foam from ionic liquids.

OBJECT OF THE INVENTION

It has now surprisingly been found that antifoams which are used for avoiding and destroying foam in aqueous systems solve the problem of defoaming ionic liquids.

This is particularly surprising since water is not a liquid having pronounced ionic character. All the more surprising was the discovery that particular antifoams which have been developed for defoaming of surfactant-stabilized aqueous (non-ionic) systems also have a good antifoaming effect in water-free (or low-water) high-grade ionic liquids and thus achieve the object of the invention.

It is therefore an object of the invention to defoam ionic liquids effectively and thus make them universally and lastingly useable in applications in which gas can be introduced under shear.

These are, in particular, applications in which the ionic liquids are used as lubricating or hydraulic fluid and the optionally dissolved gases introduced led to a decrease, in any case worsening, of the (lubricating) properties inherent in the process.

Systems in which ionic liquids themselves are used only in small amounts, e.g. in coatings or pastes/surface coatings, are expressly excluded since here foam formation is not caused by the ionic liquid.

Ionic liquids are salts in general which melt at low temperatures (<100° C.) and represent a new class of liquids which are made up exclusively of ions. In contrast to classical salt melts, which are high-melting, highly viscous and very corrosive media, ionic liquids are liquid and have a relatively low viscosity even at low temperatures (K. R. Seddon J. Chem. Technol. Biotechnol. 1997, 68, 351-356). They also differ, in particular, from water since they have a completely ionic structure.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right and hereby disclose a disclaimer of any previously described product, method of making the product or process of using the product.

DETAILED DESCRIPTION OF THE INVENTION

For the purposes of the present invention, ionic liquids are salts of the general formulae I, II, or III:

$$[A]_n^+ [Y]^{n-} \quad (I)$$

where n is 1, 2, 3 or 4, $[A]^+$ is a quaternary ammonium cation, an oxonium cation, a sulphonium cation or a phosphonium cation and $[Y]^{n-}$ is a monovalent, divalent, trivalent or tetravalent anion; or mixed salts of the general formulae (II)

$$[A^1]^+ [A^2]^+ [Y]^{2-} \quad \text{(IIa);}$$

$$[A^1]^+ [A^2]^+ [A^3]^+ [Y]^{3-} \quad \text{(IIb);}$$

or $$[A^1]^+ [A^2]^+ [A^3]^+ [A^4]^+ [Y]^{4-} \quad \text{(IIc),}$$

where $[A^1]^+$, $[A^2]^+$ $[A^3]^+$ and $[A^4]^+$ are selected independently from the groups mentioned for $[A]^+$ and $[Y]^{n-}$ is as defined in formula (I); or mixed salts of the general formulae (III)

$$[A^1]^+ [A^2]^+ [A^3]^+ [M^1]^+ [Y]^{4-} \quad \text{(IIIa);}$$

$$[A^1]^+ [A^2]^+ [M^1]^+ [M^2]^+ [Y]^{4-} \quad \text{(IIIb);}$$

$$[A^1]^+ [M^1]^+ [M^2]^+ [M^3]^+ [Y]^{4-} \quad \text{(IIIc);}$$

$$[A^1]^+ [A^2]^+ [M^1]^+ [Y]^{3-} \quad \text{(IIId);}$$

$[A^1]^+[M^1]^+[M^2]^+[Y]^{3-}$ (IIIe);

$[A^1]^+[M^1]^+[Y]^{2-}$ (IIIf);

$[A^1]^+[A^2]^+[M^4]^{2+}[Y]^{4-}$ (IIIg);

$[A^1]^+[M^1]^+[M^4]^{2+}[Y]^{4-}$ (IIIh);

$[A^1]^+[M^5]^{3+}[Y]^{4-}$ (IIIi);

or $[A^1]^+[M^4]^{2+}[Y]^{3-}$ (IIIj)

where $[A^1]^+$, $[A^2]^+$ and $[A^3]^+$ are selected independently from the groups mentioned for $[A]^+$, $[Y]^{n-}$ is as defined for formula I and $[M^1]^+$, $[M^2]^+$, $[M^3]^+$ are monovalent metal cations, $[M^4]^{2+}$ is a divalent metal cation and $[M^5]^{3+}$ is a trivalent metal cation;

or mixtures of all formulae (I)-(III) which are free of ketone resins, ketone-aldehyde resins and/or urea-aldehyde resins and/or their hydrogenated derivatives.

Ionic liquids comprise, for example, anions such as halides, carboxylates, phosphates, thiocyanates, isothiocyanates, dicyanamides, sulphates, alkylsulphates, sulphonates, alkylsulphonates, tetrafluoroborate, hexafluorophosphate or bis(trifluoromethylsulphonyl)imide combined with, for example, substituted ammonium, phosphonium, pyridinium or imidazolium cations, with the abovementioned anions and cations representing a small selection from among the large number of possible anions and cations and no claim as to completeness being made and no restriction being imposed.

The ionic liquids used according to the invention are preferably composed of a quaternary nitrogen and/or phosphorus compound and/or sulphur compound and at least one anion and their melting point is below about +250° C., preferably below about +150° C., in particular below about +100° C. Furthermore, they are free of ketone resins, ketone-aldehyde resins and/or urea-aldehyde resins and/or their hydrogenated derivatives. The ionic liquids or mixtures thereof used according to the invention are particularly preferably liquid at room temperature. For the purposes of this application, free of refers to less than 0.1% by weight or below the limit of detection by analytical means.

The compositions according to the invention contain from 80 to 99.999% by weight, preferably from 90 to 99.999% by weight, in particular at least 95% by weight and particularly preferably from >98 to 99.999% by weight, of one or more ionic liquids, and from 0 to 20% by weight, preferably from 0.01 to 10% by weight and particularly preferably from 0.1 to 5% by weight, of solvents, and from 0 to 20% by weight, preferably from 0.01 to 10% by weight and particularly preferably from 0.1 to 5% by weight, of auxiliaries and additives, and from 0.001 to 10% by weight, preferably from 0.001 to 5% by weight and particularly preferably from 0.05 to 1% by weight, of one or more antifoams according to the invention, where the sum of all components of the composition adds up to 100% by weight.

The ionic liquids which are preferably used for the purposes of the invention can, for example, comprise at least one cation of the general formulae:

$R^1R^2R^3R^4N^+$ (IV)

$R^1R^2N^+=CR^3R^4$ (V)

$R^1R^2R^3R^4P^+$ (VI)

$R^1R^2P^+=CR^3R^4$ (VII)

$R^1R^2R^3S^+$ (VIII)

where $R^1$, $R^2$, $R^3$, $R^4$ are identical or different and are each hydrogen, a linear or branched aliphatic hydrocarbon radical which has from 1 to 30 carbon atoms and may contain double bonds, a cycloaliphatic hydrocarbon radical which has from 5 to 40 carbon atoms and may contain double bonds, an aromatic hydrocarbon radical having from 6 to 40 carbon atoms, an alkylaryl radical having from 7 to 40 carbon atoms, a linear or branched aliphatic hydrocarbon radical which has from 2 to 30 carbon atoms, is interrupted by one or more heteroatoms (oxygen, NH, NR' where R' is a $C_1$-$C_{30}$-alkyl radical which may contain double bonds, in particular —$CH_3$) and may contain double bonds, a linear or branched aliphatic hydrocarbon radical which has from 2 to 30 carbon atoms, is interrupted by one or more functions selected from the group consisting of —O—C(O)—, —(O)C—O—, —NH—C(O)—, —(O)C—NH, —(CH$_3$)N—C(O)—, —(O)C—N(CH$_3$)—, —S(O$_2$)—O—, —O—S(O$_2$)—, —S(O$_2$)—NH—, —NH—S(O$_2$)—, —S(O$_2$)—N(CH$_3$)—, —N(CH$_3$)—S(O$_2$)— and may contain double bonds, a linear or branched aliphatic or cycloaliphatic hydrocarbon radical which has from 1 to 30 carbon atoms, is terminally functionalized by OH, OR', NH$_2$, N(H)R', N(R')$_2$ (where R' is a $C_1$-$C_{30}$-alkyl radical which may contain double bonds) and may contain double bonds or a polyether of the formula —(R$^5$—O)$_n$—R$^6$ having a block or random structure, where $R^5$ is a linear or branched hydrocarbon radical having from 2 to 4 carbon atoms, n is from 1 to 100, preferably from 2 to 60, and $R^6$ is hydrogen, a linear or branched aliphatic hydrocarbon radical which has from 1 to 30 carbon atoms and may contain double bonds, a cycloaliphatic hydrocarbon radical which has from 5 to 40 carbon atoms and may contain double bonds, an aromatic hydrocarbon radical having from 6 to 40 carbon atoms, an alkylaryl radical having from 7 to 40 carbon atoms or a —C(O)—R$^7$ radical where $R^7$ is a linear or branched aliphatic hydrocarbon radical which has from 1 to 30 carbon atoms and may contain double bonds, a cycloaliphatic hydrocarbon radical which has from 5 to 40 carbon atoms and may contain double bonds, an aromatic hydrocarbon radical having from 6 to 40 carbon atoms or an alkylaryl radical having from 7 to 40 carbon atoms.

Preference is given to quaternary ammonium salts of alkoxylated fatty acids, also referred to as alkanolamine ester quats, characterized by the general formula of the type $R^1R^2R^3R^4N^+$ $A^-$ (IV) where $R^1$ is an alkyl radical having from 1 to 20 carbon atoms, $R^2$ is an alkyl radical having from 1 to 4 carbon atoms, $R^3$ is a (CH$_2$CHRO)$_n$—H radical where n is from 1 to 200 and R is H or CH$_3$, $R^4$ is an alkyl radical having from 1 to 4 carbon atoms or a (CH$_2$CHRO)$_n$—H radical where n is from 1 to 200 and R is H or CH$_3$ and $A^-$ is a monovalent anion.

Among these compounds, preference is given to substances of the formula $R^6_{4-m}N^+[((CH_2)_n\text{-}Q\text{-}R^7]_m X^-$ (i)

where: each radical $R^6$ is independently an alkyl group or hydroxyalkyl group having from 1 to 6 carbon atoms or a benzyl group, preferably a methyl group; each radical $R^7$ is independently hydrogen, a linear or branched alkyl group having from 11 to 22 carbon atoms, a linear or branched alkenyl group having from 11 to 22 carbon atoms, with the proviso that at least one radical $R^7$ is not hydrogen;

Q is selected independently from the groups of the formulae —O—C(O)—, —C(O)O, —NR$^8$—C(O)—, —C(O)—NR$^8$—, —O—C(O)—O, —CHR$^9$—O—C(O)— or —CH (OCOR$^7$)—CH$_2$—O—C(O)—, where R$^8$ is hydrogen, methyl, ethyl, propyl or butyl and R$^9$ is hydrogen or methyl, and Q is preferably —O—C(O)— or —NH—C(O)—; m is from 1 to 4 and preferably 2 or 3; n is from 1 to 4 and preferably 2; and X is an anion compatible with plasticizers, e.g. chloride, bromide, methylsulphate, ethylsulphate, sulphate or nitrate, preferably chloride or methylsulphate. The quaternary ammonium compounds can contain mixtures of compounds having different groups R$^7$ which are not hydrogen and whose valency ranges from 1 to m. Such mixtures preferably have an average of from 1.2 to 2.5 groups R$^7$ which are not hydrogen. The proportion of groups R$^7$ which are not hydrogen is preferably from 1.4 to 2.0 and more preferably from 1.6 to 1.9.

The preferred quaternary ammonium compounds are the compounds of the type:

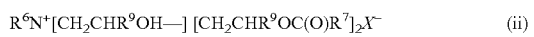 (ii)

 (iii)

 (iv)

where R$^6$, R$^7$ and X are as defined above for formula (i), with the proviso that R$^7$ is not hydrogen.

The fragment —C(O)R$^7$ is preferably a fatty acyl group. Fatty acyl groups are derived from the natural sources of triglycerides, preferably tallow, vegetable oils, partially hydrogenated tallow and partially hydrogenated vegetable oils. Useable sources of triglycerides are soybean oil, tallow, partially hydrogenated tallow, palm oil, palm kernels, rapeseeds, lard, coconut, rape, safflower oil, maize, rice and tall oil and mixtures of these components.

A person skilled in the art will know that the composition of the fatty acid-containing compounds is subject to some natural fluctuations depending on conditions from harvest to harvest or on the multiplicity of sources of vegetable oil. The R$^7$ groups are usually mixtures of linear and branched carbon chains of saturated and unsaturated aliphatic fatty acids. The proportion of unsaturated groups R$^7$ in such mixtures is preferably at least 10%, particularly preferably at least 25% and very particularly preferably from 40% to 70%. The proportion of multiply unsaturated groups R$^7$ in such mixtures is less than 10%, preferably less than 5% and particularly preferably less than 3%. If necessary, a partial hydrogenation can be carried out to increase the saturated character and thus improve the stability (e.g. odour, colour, etc.) of the end product. The content of unsaturated material, expressed by the iodine number, should be in the range from 5 to 150 and preferably in the range from 5 to 50. The ratio of cis and trans isomers of the double bonds in the unsaturated groups R$^7$ is preferably greater than 1:1 and particularly preferably in the range from 4:1 to 50:1.

Preferred examples of compounds of formula (i) are:
N,N-di(tallowyloxyethyl)-N,N-dimethylammonium chloride;
N,N-di(canolyloxyethyl)-N,N-dimethylammonium chloride;
N,N-di(tallowyloxyethyl)-N-methyl,N-(2-hydroxyethyl) ammonium methylsulphate;
N,N-di(canolyloxyethyl)-N-methyl,N-(2-hydroxyethyl) ammonium methylsulphate;
N,N-di(tallowylamidoethyl)-N-methyl,N-(2-hydroxyethyl) ammonium methylsulphate;
N,N-di(2-tallowyloxy-2-oxo-ethyl)-N,N-dimethylammonium chloride;
N,N-di(2-canolyloxy-2-oxo-ethyl)-N,N-dimethylammonium chloride;
N,N-di(2-tallowyloxyethylcarbonyloxyethyl)-N,N-dimethyl-ammonium chloride;
N,N-di(2-canolyloxyethylcarbonyloxyethyl)-N,N-dimethyl-ammonium chloride;
N-(2-tallowoyloxy-2-ethyl)-N-(2-tallowyloxy-2-oxo-ethyl)-N,N-dimethylammonium chloride;
N-(2-canolyloxy-2-ethyl)-N-(2-canolyloxy-2-oxo-ethyl)-N,N-dimethylammonium chloride;
N,N,N-tri(tallowyloxyethyl)-N-methylammonium chloride;
N,N,N-tri(canolyloxyethyl)-N-methylammonium chloride;
1,2-ditallowyloxy-3-N,N,N-trimethylammoniopropyl chloride; and
1,2-dicanolyloxy-3-N,N,N-trimethylammoniopropyl chloride.

Further preferred quaternary ammonium salts are ditallowdimethylammonium chloride, ditallowdimethyl-ammonium methylsulphate, the dimethylammonium chloride of di(hydrogenated tallow)distearyldimethylammonium chloride and dibehenyldimethylammonium chloride.

Further possible cations are ions derived from saturated or unsaturated cyclic compounds and from aromatic compounds having, in each case, at least one trivalent nitrogen atom in a 4- to 10-membered, preferably 5- or 6-membered, heterocyclic ring which may be substituted. Such cations can be described in simplified form (i.e. without indication of precise position and number of the double bonds in the molecule) by the general formulae (IX), (X) and (XI) below, where the heterocyclic rings may also contain a plurality of heteroatoms.

 (IX)

 (X)

 (XI)

R$^1$ and R$^2$ are as defined above,

R is hydrogen, a linear or branched aliphatic hydrocarbon radical which has from 1 to 30 carbon atoms and may contain double bonds, a cycloaliphatic hydrocarbon radical which has from 5 to 40 carbon atoms and may contain double bonds, an aromatic hydrocarbon radical having from 6 to 40 carbon atoms or an alkylaryl radical having from 7 to 40 carbon atoms, X is an oxygen atom, a sulphur atom or a substituted nitrogen atom (X=O, S, NR$^1$).

Examples of cyclic nitrogen compounds of the abovementioned type are pyrrolidine, dihydropyrrole, pyrrole, imidazoline, oxazoline, oxazole, thiazoline, thiazole, isoxazole, isothiazole, indole, carbazole, piperidine, pyridine, the isomeric picolines and lutidines, quinoline and isoquinoline. The cyclic nitrogen compounds of the general formulae (IX), (X) and (XI) can be unsubstituted (R═H) or monosubstituted or multiply substituted by the radical R, where in the case of multiple substitution by R, the individual radicals R may be different.

Further possible cations are ions derived from saturated acyclic compounds, saturated or unsaturated cyclic compounds and from aromatic compounds having, in each case, more than one trivalent nitrogen atom in a 4- to 10-membered, preferably 5- or 6-membered, heterocyclic ring. These compounds can be substituted both on the carbon atoms and on the nitrogen atoms. They can also be fused with substituted or unsubstituted benzene rings and/or cyclohexane rings to form polycyclic structures.

Examples of such compounds are pyrazole, 3,5-dimethylpyrazole, imidazole, benzimidazole, N-methyl imidazole, dihydropyrazole, pyrazolidine, pyridazine, pyrimidine, pyrazine, 2,3-, 2,5- and 2,6-dimethylpyrazine, cimoline, phthalazine, quinazoline, phenazine and piperazine. Cations derived from imidazole and its alkyl and phenyl derivatives have been found to be particularly useful as constituents of ionic liquids.

Further possible cations are ions which contain two nitrogen atoms and have the general formula (XII)

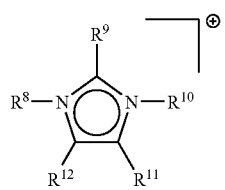

(XII)

where $R^8$, $R^9$, $R^{10}$, $R^{11}$, $R^{12}$ are identical or different and are each hydrogen, a linear or branched aliphatic hydrocarbon radical which has from 1 to 30 carbon atoms and may contain double bonds, a cycloaliphatic hydrocarbon radical which has from 5 to 40 carbon atoms and may contain double bonds, an aromatic hydrocarbon radical having from 6 to 40 carbon atoms, an alkylaryl radical having from 7 to 40 carbon atoms, a linear or branched aliphatic hydrocarbon radical which has from 1 to 30 carbon atoms, is interrupted by one or more heteroatoms (oxygen, NH, NR' where R' is a $C_1$-$C_{30}$-alkyl radical which may contain double bonds) and may contain double bonds, a linear or branched aliphatic hydrocarbon radical which has from 1 to 30 carbon atoms, is interrupted by one or more functions selected from the group consisting of —O—C(O)—, —(O)C—O—, —NH—C(O)—, —(O)C—NH,—(CH$_3$)N—C(O)—, —(O)C—N(CH$_3$)—S(O$_2$)—O—, —O—S(O$_2$)—, —S(O$_2$)—NH—, —NH—S(O$_2$)—, —S(O$_2$)—N(CH$_3$)—, —N(CH$_3$)—S(O$_2$)— and may contain double bonds, a linear or branched aliphatic or cycloaliphatic hydrocarbon radical which has from 1 to 30 carbon atoms, is terminally functionalized by OH, OR', NH$_2$, N(H)R', N(R')$_2$, where R' is a $C_1$-$C_{30}$-alkyl radical which may contain double bonds, and may contain double bonds or a polyether of the formula —($R^5$—O)$_n$—$R^6$ having a block or random structure, where $R^5$ is a hydrocarbon radical containing from 2 to 5 carbon atoms, n is from 1 to 100 and $R^6$ is hydrogen, a linear or branched aliphatic hydrocarbon radical which has from 1 to 30 carbon atoms and may contain double bonds, a cycloaliphatic hydrocarbon radical which has from 5 to 40 carbon atoms and may contain double bonds, an aromatic hydrocarbon radical having from 6 to 40 carbons, an alkylaryl radical having from 7 to 40 carbon atoms or a —C(O)—$R^7$ radical where $R^7$ is a linear or branched aliphatic hydrocarbon radical which has from 1 to 30 carbon atoms and may contain double bonds, a cycloaliphatic hydrocarbon radical which has from 5 to 40 carbon atoms and may contain double bonds, an aromatic hydrocarbon radical having from 6 to 40 carbon atoms, an alkylaryl radical having from 7 to 40 carbon atoms.

Very particularly preferred imidazolium ions (XII) are 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium, 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium and 1,4,5-trimethyl-3-octylimidazolium.

Further possible cations are ions which form dications, trications or polycations composed of, in particular, the abovementioned cations which have been dimerized, trimerized or polymerized. These encompass dications, trications and polycations which have a polymeric backbone, for example a backbone based on siloxanes, polyethers, polyesters, polyamides or polyacrylates, in particular branched and hyperbranched polymers.

Further possible ionic liquids are those in which the cation $[A]^+$ is a pyridinium ion (XIIIa)

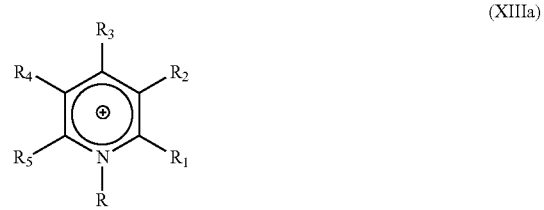

(XIIIa)

where one of the radicals $R_1$ to $R_5$ is methyl, ethyl or chlorine and the remaining radicals $R_1$ to $R_5$ are each hydrogen;

$R_3$ is dimethylamino and the remaining radicals $R_1$, $R_2$, $R_4$ and $R_5$ are each hydrogen;

all radicals $R_1$ to $R_5$ are hydrogen;

$R_2$ is carboxy or carboxamide and the remaining radicals $R_1$, $R_2$, $R_4$ and $R_5$ are each hydrogen; or $R_1$ and $R_2$ or $R_2$ and $R_3$ are 1,4-buta-1,3-dienylene and the remaining radicals $R_1$, $R_2$, $R_4$ and $R_5$ are each hydrogen; and in particular one in which $R_1$ to $R_5$ are each hydrogen; or one of the radicals $R_1$ to $R_5$ is methyl or ethyl and the remaining radicals $R_1$ to $R_5$ are each hydrogen.

Very particularly preferred pyridinium ions (XIIIa) are 1-methylpyridinium, 1-ethylpyridinium, 1-(1-butyl)-pyridinium, 1-(1-hexyl)pyridinium, 1-(1-octyl)pyridinium, 1-(1-hexyl)pyridinium, 1-(1-octyl)pyridinium, 1-(1-dodecyl)pyridinium, 1-(1-tetradecyl)pyridinium, 1-(1-hexadecyl)pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethylpyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethylpyridinium and 1-(1-octyl)-2-methyl-3-ethylpyridinium, 1-(1-dodecyl)-2-methyl-3-ethyl-pyridinium, 1-(1-tetradecyl)-2-methyl-3-ethylpyridinium and 1-(1-hexadecyl)-2-methyl-3-ethylpyridinium.

Further possible ionic liquids are those in which the cation $[A]^+$ is a pyridazinium ion (XIIIb)

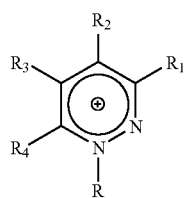

(XIIIb)

where $R_1$ to $R_4$ are each hydrogen; or one of the radicals $R_1$ to $R_4$ is methyl or ethyl and the remaining radicals $R_1$ to $R_4$ are each hydrogen.

In addition, very particular preference is given to ionic liquids in which the cation $[A]^+$ is a pyrimidinium ion (XIIIc),

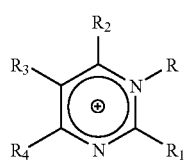

(XIIIc)

where $R_1$ is hydrogen, methyl or ethyl and $R_2$ to $R_4$ are each, independently of one another, hydrogen or methyl; or $R_1$ is hydrogen, methyl or ethyl, $R_2$ and $R_4$ are each methyl and $R_3$ is hydrogen.

Further possible ionic liquids are those in which the cation $[A]^+$ is a pyrazinium ion (XIIId),

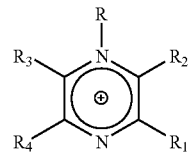

(XIIId)

where $R_1$ is hydrogen, methyl or ethyl and $R_2$ to $R_4$ are each, independently of one another, hydrogen or methyl;

$R_1$ is hydrogen, methyl or ethyl, $R_2$ and $R_4$ are each methyl and $R_3$ is hydrogen;

$R_1$ to $R_4$ are each methyl; or $R_1$ to $R_4$ are each methyl or hydrogen.

Further possible ionic liquids are those in which the cation $[A]^+$ is a pyrazolium ion (XIIIf), (XIIIg) or (XIIIg'),

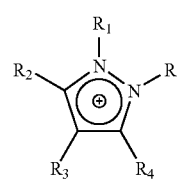

(XIIIf)

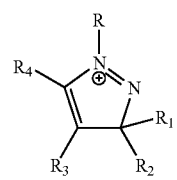

(XIIIg)

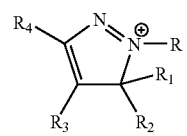

(XIIIg')

where $R_1$ is hydrogen, methyl or ethyl and $R_2$ to $R_4$ are each, independently of one another, hydrogen or methyl.

Further possible ionic liquids are those in which the cation $[A]^+$ is a pyrazolium ion (XIIIh),

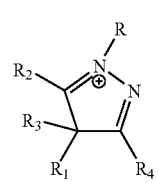

(XIIIh)

where $R_1$ to $R_4$ are each, independently of one another, hydrogen or methyl.

Additional possible ionic liquids are those in which the cation [A]⁺ is a 1-pyrazolinium ion (XIIIi),

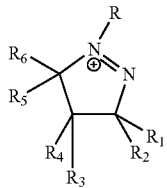
(XIIIi)

where $R_1$ to $R_6$ are each, independently of one another, hydrogen or methyl.

Further possible ionic liquids are those in which the cation [A]⁺ is a 2-pyrazolinium ion (XIIIj),

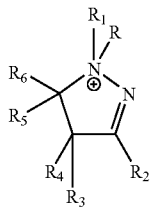
(XIIIj)

where $R_1$ is hydrogen, methyl, ethyl or phenyl and $R_2$ to $R_6$ are each, independently of one another, hydrogen or methyl.

Further suitable ionic liquids are those in which the cation [A]⁺ is a 3-pyrazolinium ion (XIIIk) or (XIIIk'),

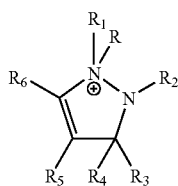
(XIIIk)

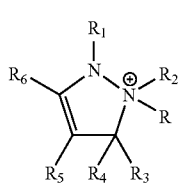
(XIIIk')

where $R_1$ and $R_2$ are each, independently of one another, hydrogen, methyl, ethyl or phenyl and $R_3$ to $R_6$ are each, independently of one another, hydrogen or methyl.

Additional possible ionic liquids are those in which the cation [A]⁺ is an imidazolinium ion (XIIIl),

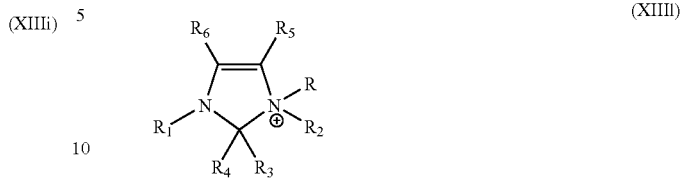
(XIIIl)

where

R is H or methyl, $R_1$ and $R_2$ are each, independently of one another, hydrogen, methyl or ethyl or a linear saturated or unsaturated acyl radical having from 14 to 22, preferably from 16 to 18, carbon atoms and $R_3$ to $R_6$ are each, independently of one another, hydrogen, a linear saturated alkyl radical which has 1-4 carbon atoms and may contain OH groups, preferably methyl or a fatty acid radical; with particular preference being given to $R_1$ and $R_2$ being fatty acyl radicals and R or $R_2$ and $R_3$ being fatty acyl radicals. The substances corresponding to formula (XIIIm) are of particular importance. In the literature, these are sometimes also given misleading formulae (analogous to XIIIm' or XIIIl).

Additional possible ionic liquids are those in which the cation [A]⁺ is an imidazolinium ion (XIIIm) or (XIIIm'),

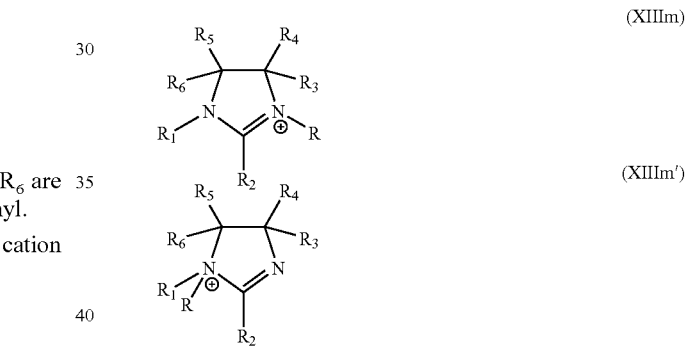
(XIIIm)

(XIIIm')

where

R is H or methyl, $R_1$ and $R_2$ are each, independently of one another, hydrogen, methyl or ethyl or a linear saturated or unsaturated acyl radical having from 14 to 22, preferably from 16 to 18, carbon atoms and $R_3$ to $R_6$ are each, independently of one another, hydrogen, a linear saturated alkyl radical which has 1-4 carbon atoms and may contain OH groups, preferably methyl or a fatty acid radical; with particular preference given to $R_1$ and $R_2$ being fatty acyl radicals and R or $R_2$ and $R_3$ being fatty acyl radicals. The substances corresponding to formula (XIIIm) are of particular importance. In the literature, these are sometimes also given misleading formulae (analogous to XIIIm' or XIII).

Further possible ionic liquids are those in which the cation [A]⁺ is an imidazolinium ion (XIIIn) or (XIIIn'),

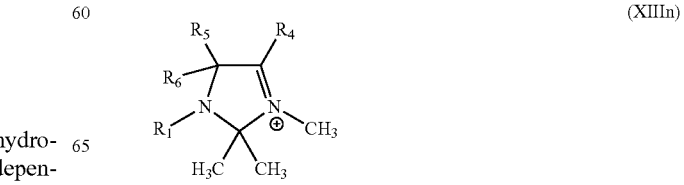
(XIIIn)

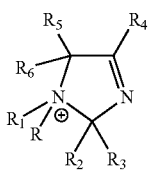

where

R$_1$ to R$_3$ are each, independently of one another, hydrogen, methyl or ethyl and R$_4$ to R$_6$ are each, independently of one another, hydrogen or methyl.

Additional possible ionic liquids are those in which the cation [A]$^+$ is a thiazolium ion (XIIIo) or (XIIIo') or an oxazolium ion (XIIIp),

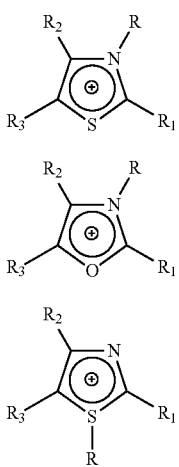

where

R$_1$ is hydrogen, methyl, ethyl or phenyl and R$_2$ and R$_3$ are each, independently of one another, hydrogen or methyl.

Further possible ionic liquids are those in which the cation [A]$^+$ is a 1,2,4-triazolium ion (XIIIq), (XIIIq') or (XIIIq"),

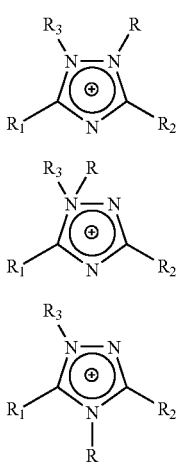

where

R$_1$ and R$_2$ are each, independently of one another, hydrogen, methyl, ethyl or phenyl and R$_3$ is hydrogen, methyl or phenyl.

Further possible ionic liquids are those in which the cation [A]$^+$ is a 1,2,3-triazolium ion (XIIIr), (XIIIr') or (XIIIr"),

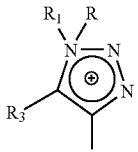

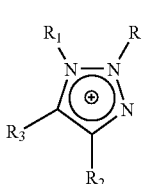

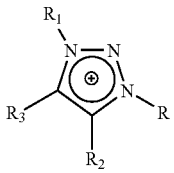

where

R$_1$ is hydrogen, methyl or ethyl and R$_2$ and R$_3$ are each, independently of one another, hydrogen or methyl or R$_2$ and R$_3$ together are 1,4-buta-1,3-dienylene.

Additional possible ionic liquids are those in which the cation [A]$^+$ is a pyrrolidinium ion (XIIIs),

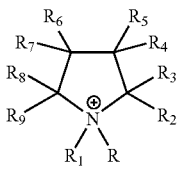

where

R$_1$ is hydrogen, methyl, ethyl or phenyl and R$_2$ to R$_9$ are each, independently of one another, hydrogen or methyl.

Additional possible ionic liquids are those in which the cation [A]$^+$ is an imidazolidinium ion (XIIIt),

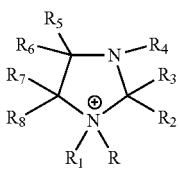

where

R$_1$ and R$_4$ are each, independently of one another, hydrogen, methyl, ethyl or phenyl and R$_2$ and R$_3$ and also R$_5$ to R$_8$ are each, independently of one another, hydrogen or methyl.

Further possible ionic liquids are those in which the cation [A]⁺ is an ammonium ion (IV), $$R-\overset{R_1}{\underset{R_3}{\overset{\oplus}{N}}}-R_2 \qquad (IV)$$

where $R_1$ to $R_3$ are each, independently of one another, C1-C18-alkyl; or $R_1$ to $R_3$ are each, independently of one another, hydrogen or C1-C18-alkyl and $R_4$ is 2-hydroxyethyl; or $R_1$ and $R_2$ together are 1,5-pentylene or 3-oxa-1,5-pentylene and $R_3$ is C1-C18-alkyl, 2-hydroxyethyl or 2-cyanoethyl.

Particularly preferred ammonium ions (IV) are methyltri (1-butyl)ammonium, 2-hydroxyethylammonium, bis(2-hydroxyethyl)dimethlyammonium, N,N-dimethylpiperidinium and N,N-dimethylmorpholinium. Additional possible ionic liquids are those in which the cation [A]⁺ is a guanidinium ion (IVv), $$\begin{array}{c} R_1\diagdown\phantom{N}\diagup R \\ \phantom{XX}N \\ R_2\diagdown\phantom{N}\overset{\oplus}{\phantom{N}}\diagup R_5 \\ \phantom{X}N\phantom{XXX}N \\ \phantom{XXX}|\phantom{XXX}| \\ \phantom{XXX}R_3\phantom{XX}R_4 \end{array} \qquad (IVv)$$

where $R_1$ to $R_5$ are each methyl; or $R_1$ to $R_5$ are each, independently of one another, C1-C18-alkyl; or $R_1$ to $R_5$ are each, independently of one another, hydrogen or C1-C18-alkyl or 2-hydroxyethyl.

A very particularly preferred guanidinium ion (IVv) is N,N,N',N',N'',N''-hexamethylguanidinium.

Further possible ionic liquids are those in which the cation [A]⁺ is a derivative of ethanolamine, e.g. a cholinium ion (XIIIw) or a diethanolamine (XIIIw') or a triethanolamine (XIIIw''), $$R-\overset{R_1}{\underset{R_2}{\overset{\oplus}{N}}}-\!\!\diagdown\!\!\diagdown OR_3 \qquad (XIIIw)$$

$$R-\overset{\diagup\!\!\diagup OR_4}{\underset{R_2}{\overset{\oplus}{N}}}-\!\!\diagdown\!\!\diagdown OR_3 \qquad (XIIIw')$$

$$R-\overset{\diagup\!\!\diagup OR_4}{\underset{\diagdown\!\!\diagdown OR_5}{\overset{\oplus}{N}}}-\!\!\diagdown\!\!\diagdown OR_4 \qquad (XIIIw'')$$

where $R_1$ and $R_2$ are each, independently of one another, methyl, ethyl, 1-butyl or 1-octyl and $R_3$ is hydrogen, methyl, ethyl, acetyl, —SO₂OH or —PO(OH)₂; or $R_1$ is methyl, ethyl, 1-butyl or 1-octyl, $R_2$ is a —CH₂—CH₂—OR₄ group and $R_3$ and $R_4$ are each, independently of one another, hydrogen, methyl, ethyl, acetyl, -SO₂OH or —PO(OH)₂; or $R_1$ is a —CH₂—CH₂—OR₄ group, $R_2$ is a —CH₂—CH₂—OR₅ group and $R_3$ to $R_5$ are each, independently of one another, hydrogen, methyl, ethyl, acetyl, —SO₂OH or —PO(OH)₂; or $R_1$ is methyl, ethyl, 1-butyl, 1-octyl, acetyl, —SO₂OH, or —PO(OH)₂ and $R_3$ to $R_5$ are each, independently of one another, hydrogen, methyl, ethyl, acetyl, —SO₂OH, —PO(OH)₂ or —(C$_n$H$_{2n}$O)$_m$R₁ where n=1 to 5 and m=1 to 100.

Preference is also given to compounds in which R, $R_1$ and $R_2$ are alkyl groups having from 1 to 4 carbon atoms, particularly preferably methyl groups, and $R_3$ and/or $R_4$ are saturated or unsaturated fatty acid or acyl radicals having from 8 to 22 carbon atoms, preferably from 12 to 18 carbon atoms. It is also possible for mixtures of acyl or fatty acid radicals (in particular, for example, in naturally occurring ratios) to be present.

In formula (XIIIw''), very particular preference is given to R, $R_1$, $R_2$ each being an alkyl radical having from 1 to 4 carbon atoms, in particular a methyl group, and $R_3$ being a fatty acid radical and $R_4$ and $R_5$ each being a fatty acid radical or hydrogen.

Possible ionic liquids include those in which the cation [A]⁺ is a phosphonium ion (VI) in which $R_1$ to $R_3$ are each, independently of one another, C1-C18-alkyl, in particular butyl, isobutyl, 1-hexyl or 1-octyl.

Among the abovementioned cations, preference is given to the pyridinium ions (XIIIa), imidazolium ions (XII) and ammonium ions (IV), in particular 1-methylpyridinium, 1-ethylpyridinium, 1-(1-butyl)pyridinium, 1-(1-hexyl)-pyridinium, 1-(1-octyl)pyridinium, 1-(1-hexyl)pyridinium, 1-(1-octyl)pyridinium, 1-(1-dodecyl)pyridinium, 1-(1-tetradecyl)pyridinium, 1-(1-hexadecyl)pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethylpyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethylpyridinium, 1-(1-octyl)-2-methyl-3-ethylpyridinium, 1-(1-dodecyl)-2-methyl-3-ethylpyridinium, 1-(1-tetradecyl)-2-methyl-3-ethylpyridinium, 1-(1-hexadecyl)-2-methyl-3-ethylpyridinium, 1-methylimidazolium, 1-ethyl-imidazolium, 1-(1-butyl)imidazolium, 1-(1-octyl)imidazolium, 1-(1-dodecyl)imidazolium, 1-(1-tetra-decyl)imidazolium, 1-(1-hexadecyl)imidazolium, 1,3-dimethylimidazolium, 1-ethyl-3-methylimidazolium, 1-(1-butyl)-3-methylimidazolium, 1-(1-hexyl)-3-methyl-imidazolium, 1-(1-octyl)-3-methylimidazolium, 1-(1-dodecyl)-3-methylimidazolium, 1-(1-tetradecyl)-3-methylimidazolium, 1-(1-hexadecyl)-3-methylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium and 1-(1-octyl)-2,3-dimethylimidazolium, 1,4-dimethyl-imidazolium, 1,3,4- trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethyl-imidazolium, 1,4,5-trimethyl-3-butylimidazolium, 1,4,5-trimethyl-3-octylimidazolium and 2-hydroxyethylammonium.

The metal cations $[M^1]^+$, $[M^2]^+$, $[M^3]^+$, $[M^4]^{2+}$ and $[M^5]^{3+}$ mentioned in the formulae (IIIa) to (IIIj) are generally metal cations of groups 1., 2., 6., 7., 8., 9., 10., 11., 12. and 13. of the Periodic Table. Suitable metal cations are, for example, $Li^+$, $Na^+$, $K^+$, $Cs^+$, $Mg^{2+}$, $Ca^{2+}$, $Ba^{2+}$, $Cr^{2+}$, $Fe^{2+}$, $Co^{2+}$, $Ni^{2+}$, $Cu^{2+}$, $Ag^+$, $Zn^{2+}$ and $Al^{3+}$.

The ionic liquids used according to the invention comprise at least one of the abovementioned cations combined with, in each case, at least one anion.

Possible anions are in principle all anions which in combination with the cation lead to an ionic liquid. The anion $[Y]^{n-}$ of the ionic liquid is, for example, selected from:

the group of halides and halogen-containing compounds of the formulae: $F^-$, $Cl^-$, $Br^-$, $I^-$, $BF_4^-$, $PF_6^-$, $AlCl_4^-$, $Al_2Cl_7^-$, $Al_3Cl_{10}^-$, $AlBr_4^-$, $FeCl_4^-$, $BCl_4^-$, $SbF_6^-$, $AsF_6^-$, $ZnCl_3^-$, $SnCl_3^-$, $CuCl_2^-$, $CF_3SO_3^-$, $(CF_3SO_3)_2N^-$, $CF_3CO_2^-$, $CCl_3CO_2^-$, $CN^-$, $SCN^-$, $OCN^-$, $NO_2^-$, $NO_3^-$, $N(CN)^-$;

the group of sulphates, sulphites and sulphonates of the general formulae: $SO_4^{2-}$, $HSO_4^-$, $SO_3^{2-}$, $HSO_3^-$, $R^aOSO_3^-$, $R^aSO_3^-$;

the group of phosphates of the general formulae: $PO_4^{3-}$, $HPO_4^{2-}$, $H_2PO_4^-$, $R^aPO_4^{2-}$, $HR^aPO_4^-$, $R^aR^bPO_4^-$;

the group of phosphonates and phosphinates of the general formulae: $R^aHPO_3^-$, $R^aR^bPO_2^-$, $R^aR^bPO_3^-$;

the group of phosphites of the general formulae: $PO_3^{3-}$, $HPO_3^{2-}$, $H_2PO_3^-$, $R^aPO_3^{2-}$, $R^aHPO_3^-$, $R^aR^bPO_3^-$;

the group of phosphonites and phosphinites of the general formulae: $R^aR^bPO_2^-$, $R^aHPO_2^-$, $R^aR^bPO^-$, $R^aHPO^-$;

the group of carboxylates of the general formula: $R^aCOO^-$;

the group of borates of the general formulae: $BO_3^{3-}$, $HBO_3^{2-}$, $H_2BO_3^-$, $R^aR^bBO_3^-$, $R^aHBO_3^-$, $R^aBO_3^{2-}$, $B(OR^a)(OR^b)(OR^c)(OR^d)^-$, $B(HSO_4)^-$, $B(R^aSO_4)^-$;

the group of boronates of the general formulae: $R^aBO_2^{2-}$, $R^aR^bBO^-$;

the group of carbonates and carbonic esters of the general formulae: $HCO_3^-$, $CO_3^{2-}$, $R^aCO_3^-$;

the group of silicates and silicic esters of the general formulae: $SiO_4^{4-}$, $HSiO_4^{3-}$, $H_2SiO_4^{2-}$, $H_3SiO_4^-$, $R^aSiO_4^{3-}$, $R^aR^bSiO_4^{2-}$, $R^aR^bR^cSiO_4^-$, $HR^aSiO_4^{2-}$, $H_2R^aSiO_4^-$, $HR^aR^bSiO_4^-$;

the group of alkylsilane and arylsilane salts of the general formulae: $R^aSiO_3^{3-}$, $R^aR^bSiO_2^{2-}$, $R^aR^bR^cSiO^-$, $R^aR^bR^c SiO_3^-$, $R^aR^bR^cSiO_2^-$, $R^aR^bSiO_3^{2-}$;

the group of carboximides, bis(sulphonyl)imides and sulphonylimides of the general formulae:

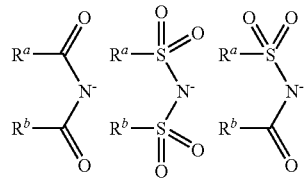

the group of methides of the general formula:

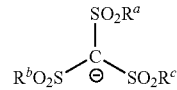

the group of alkoxides and aryloxides of the general formula: $R^aO^-$;

the group of halometalates of the general formula $[M_rHal_t]^{s-}$, where M is a metal and Hal is fluorine, chlorine, bromine or iodine, r and t are positive integers and indicate the stoichiometry of the complex and s is a positive integer and indicates the charge on the complex;

the group of sulphides, hydrogensulphides, polysulphides, hydrogenpolysulphides and thiolates of the general formulae: $S^{2-}$, $HS^-$, $[S_v]^{2-}$, $[HS_v]^-$, $[R^aS]^-$, where v is a positive integer from 2 to 10;

the group of complex metal ions such as $Fe(CN)_6^{3-}$, $Fe(CN)_6^{4-}$, $MnO_4^-$, $Fe(CO)_4^-$.

Here, $R^a$, $R^b$, $R^c$ and $R^d$ are each, independently of one another, hydrogen; $C_1$-$C_{30}$-alkyl and its aryl-, heteroaryl-, cycloalkyl-, halogen-, hydroxyl-, amino-, carboxy-, formyl-, —O—, —CO—, —CO—O— or —CO—N-substituted derivatives, for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, phenylmethyl (benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl or $C_qF_{2(q-a)+(1-b)}H_{2a+b}$ where $q<30$, $0 \leq a \leq q$ and $b=0$ or 1 (for example $CF_3$, $C_2F_5$, $CH_2CH_2$—$C_{(q-2)}F_{2(q-2)+1}$, $C_6F_{13}$, $C_8F_{17}$, $C_{10}F_{21}$, $C_{12}F_{25}$);

$C_3$-$C_{12}$-cycloalkyl and its aryl-, heteroaryl-, cycloalkyl-, halogen-, hydroxyl-, amino-, carboxy-, formyl-, —O—, —CO— or —CO—O-substituted derivatives, for example cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl or $C_qF_{2(q-a)-(1-b)}H_{2a-b}$ where $q \leq 30$, $0 \leq a \leq q$ and $b=0$ or 1;

$C_2$-$C_{30}$-alkenyl and its aryl-, heteroaryl-, cycloalkyl-, halogen-, hydroxyl-, amino-, carboxy-, formyl-, —O—, —CO— or —CO—O-substituted derivatives, for example 2-propenyl, 3-butenyl, cis-2-butenyl, trans-2-butenyl or $C_qF_{2(q-a)-(1-b)}H_{2a-b}$ where $q \leq 30$, $0 \leq a \leq q$ and $b=0$ or 1;

$C_3$-$C_{12}$-cycloalkenyl and its aryl-, heteroaryl-, cycloalkyl-, halogen-, hydroxyl-, amino-, carboxy-, formyl-, —O—, —CO— or —CO—O-substituted derivatives, for example 3-cyclopentenyl, 2-cyclohexenyl, 3-cyclohexenyl, 2,5-cyclohexadienyl or $C_qF_{2(q-a)-3(1-b)}H_{2a-3b}$ where $q \leq 30$, $0 \leq a \leq q$ and $b=0$ or 1;

aryl or heteroaryl having from 2 to 30 carbon atoms, and their alkyl-, aryl-, heteroaryl-, cycloalkyl-, halogen-, hydroxyl-, amino-, carboxy-, formyl-, —O—, —CO— or —CO—O-substituted derivatives, for example phenyl, 2-methylphenyl (2-tolyl), 3-methylphenyl (3-tolyl), 4-methylphenyl, 2-ethylphenyl, 3-ethylphenyl, 4-ethylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 4-phenylphenyl, 1-naphthyl, 2-naphthyl, 1-pyrrolyl, 2-pyrrolyl, 3-pyrrolyl, 2-pyridinyl, 3-pyridinyl, 4-pyridinyl or $C_6F_{(5-a)}Ha$ where $0 \leq a \leq 5$; or two radicals form an unsaturated, saturated or aromatic ring which may be substituted by functional groups, aryl, alkyl, aryloxy, alkyloxy, halogen, heteroatoms and/or heterocycles and may be interrupted by one or more oxygen and/or sulphur atoms and/or one or more substituted or unsubstituted imino groups.

Possible anions are, for example, chloride; bromide; iodide; thiocyanate; hexafluorophosphate; trifluoromethanesulphonate; methanesulphonate; formate, acetate; glycolate; lactate; oxalate; citrate; malate;

maleate; tartrate; mandelate; nitrate; nitrite; trifluoroacetate; sulphate; hydrogensulphate; methylsulphate; ethylsulphate; 1-propylsulphate; 1-butylsulphate; 1-hexylsulphate; 1-octylsulphate; phosphate; dihydrogenphosphate; hydrogenphosphate; $C_1$-$C_4$-dialkylphosphate; propionate; tetrachloroaluminate; $Al_2Cl_7^-$; chlorozincate; chloroferrate; bis(trifluoro-methylsulphonyl)imide; bis(pentafluoroethylsulphonyl)imide; bis(methylsulphonyl)imide; bis(p-tolylsulphonyl)imide; tris(trifluoromethylsulphonyl)methide; bis(pentafluoroethylsulphonyl)methide; p-tolylsulphonate; tetracarbonylcobaltate; dimethylene-glycolmonomethylethersulphate; oleate; stearate; acrylate; methacrylate; maleate; hydrogencitrate; vinylphosphonate; bis(pentafluoroethyl)phosphinate; borates such as bis[salicylato(2–)]borate, bis[oxalato(2–)]borate, bis[1,2-benzoldiolato(2–)—O,O']borate, tetracyanoborate, tetrafluoroborate; dicyanamide; tris(pentafluoroethyl)trifluorophosphate; tris(heptafluoropropyl)trifluorophosphate, cyclic arylphosphates such as catecholphosphate $(C_6H_4O_2)P(O)O^-$ and chlorocobaltate.

Preferred anions are selected from the group consisting of, without making a claim as to completeness, halides, bis(perfluoroalkylsulphonyl)amides or bis(perfluoroalkylsulphonyl)imides, e.g. bis(trifluoromethylsulphonyl)imide, alkyltosylates and aryltosylates, perfluoroalkyltosylates, nitrate, sulphate, hydrogensulphate, alkylsulphates and arylsulphates, polyether sulphates and polyethersulphonates, perfluoroalkylsulphates, sulphonate, alkylsulphonates and arylsulphonates, perfluorinated alkylsulphonates and arylsulphonates, alkylcarboxylates and arylcarboxylates, perfluoroalkylcarboxylates, perchlorate, tetrachloro-aluminate, saccharinate. Further preferred anions are dicyanamide, thiocyanate, isothiocyanate, tetraphenylborate, tetrakis(pentafluorophenyl)borate, tetrafluoroborate, hexafluorophosphate, polyether phosphates and phosphate.

Very particularly preferred anions are chloride, bromide, hydrogensulphate, tetrachloroaluminate, thiocyanate, methylsulphate, ethylsulphate, methanesulphonate, formate, acetate, glycolate, lactate, dimethylphosphate, diethylphosphate, p-tolylsulphonate, tetrafluoroborate and hexafluorophosphate.

Very particularly preferred ionic liquids for the purposes of the present disclosure are: 1-butyl-3-methylimidazolium 2-(2-methoxyethoxy)ethyl-sulphate, 1-butyl-3-methylimidazolium acetate, 1-ethyl-3-methylimidazolium acetate, tetrabutylammonium benzoate, trihexyltetradecylphosphonium bis(2,4,4-trimethylpentyl)phosphinate, 1-ethyl-3-methylimidazolium bis(pentafluoroethylsulphonyl)imide, 1-butyl-1-methylpyrrolidinium bis(trifluoromethylsulphonyl)imide, 1-butyl-3-methylimidazolium bis(trifluoromethylsulphonyl) imide, 1-butyl-3-methylpyridinium bis(trifluoromethylsulphonyl)imide, 1,2-dimethyl-3-propylimidazolium bis(trifluoromethyl-sulphonyl)imide, 1-ethyl-3-methylimidazolium bis(tri-fluoromethylsulphonyl) imide, 3-methyl-1-propylpyridinium bis(trifluoromethylsulphonyl)imide, methyltrioctyl-ammonium bis(trifluoromethylsulphonyl)imide, tetrabutyl-ammonium bis(trifluoromethylsulphonyl)imide, trihexyl-tetradecylphosphonium bis(trifluoromethylsulphonyl)imide, 1-butyl-1-methylpyrrolidinium bromide, 1-butylpyridinium bromide, 1-ethyl-3-methylimidazolium bromide, 4-methyl-N-butylpyridinium bromide, tetrabutylammonium bromide, tetrabutylphosphonium bromide, tetraheptylammonium bromide, tetrahexylammonium bromide, tetraoctylammonium bromide, tetraoctylphosphonium bromide, tetrapentylammonium bromide, tributylhexadecylphosphonium bromide, 1-allyl-3-methylimidazolium chloride, 1-benzyl-3-methylimidazolium chloride, 1-butyl-1-methylpyrrolidinium chloride, 1-butyl-2,3-dimethylimidazolium chloride, 1-butyl-3-methylimidazolium chloride, 1-butyl-4-methylpyridinium chloride, 1-ethyl-2,3-dimethylimidazolium chloride, 1-ethyl-3-methylimidazolium chloride, 1-hexyl-3-methylimidazolium chloride, 1-methyl-3-octylimidazolium chloride, methylimidazolium chloride, tetrabutylammonium chloride, tetrabutylphosphonium chloride, tetraheptylammonium chloride, tetraoctylammonium chloride, trihexyltetradecylphosphonium chloride, butylammonium α-cyano-4-hydrocinnamate, diethylammonium α-cyano-4-hydrocinnamate, trihexyltetradecylphosphonium decanoate, 1-butyl-1-methylpyrrolidinium dicyanamide, 1-butyl-3-methylimidazolium dicyanamide, 1-ethyl-3-methylimidazolium dicyanamide, trihexyltetradecyl-phosphonium dicyanamide, 1-ethyl-2,3-dimethylimidazolium ethylsulphate, 1-ethyl-3-methylimidazolium ethylsulphate, 1-benzyl-3-methylimidazolium hexafluorophosphate, 1-butyl-2,3-dimethylimidazolium hexafluorophosphate, 1-butyl-3-(3,3-tridecafluorooctyl)imidazolium hexafluorophosphate, 1-butyl-3-methylimidazolium hexafluorophosphate, 1-ethyl-3-methylimidazolium hexafluorophosphate, 1-hexyl-3-methylimidazolium hexafluorophosphate, 1-methyl-3-(3,3-tridecafluorooctyl)imidazolium hexafluorophosphate, 1-butyl-4-methylpyridinium hexafluorophosphate, 1-methyl-3-octylimidazolium hexafluorophosphate, trihexyltetradecylphosphonium hexafluorophosphate, 1-butyl-3-methylimidazolium hydrogensulphate, 1-ethyl-3-methylimidazolium hydrogensulphate, methylimidazolium hydrogensulphate, 1-dodecyl-3-methylimidazolium hydrogensulphate, 1-dodecyl-3-methylimidazolium iodide, tetrahexylammonium iodide, 1-butyl-3-methylimidazolium methanesulphonate, 1-ethyl-3-methylimidazolium methanesulphonate, tetrabutylammonium methanesulphonate, tetrabutylphosphonium methanesulphonate, 1-butyl-3-methylimidazolium methylsulphate, 1,3-dimethylimidazolium methylsulphate, methyltributylammonium methylsulphate, 1-ethyl-3-methylimidazolium methylsulphate, 1,2,3-trimethylimidazolium methylsulphate, 1-butyl-3-methylimidazolium nitrate, 1-ethyl-3-methylimidazolium nitrate, tetrabutylammonium nonafluorobutanesulphonate, tetrabutylammonium heptadecafluorooctanesulphonate, 1-butyl-3-methylimidazolium octylsulphate, 4-(3-butyl-1-imidazolio)butana-1-sulphonate, 3-(triphenylphosphonio)-propane-1-sulphonate, 1-butyl-3-methylimidazolium tetrachloroaluminate, 1-ethyl-3-methylimidazolium tetrachloroaluminate, 1-benzyl-3-methylimidazolium tetrafluoroborate, 1-butyl-2,3-dimethylimidazolium tetrafluoroborate, 1-butyl-3-methylimidazolium tetrafluoroborate, 1-ethyl-3-methylimidazolium tetrafluoroborate, 1-hexyl-3-methylimidazolium tetra-fluoroborate, 1-methyl-3-octylimidazolium tetrafluoro-borate, 1-butyl-1-methylpyrrolidinium tetrafluoroborate, 1-butyl-4-methylpyridinium tetrafluoroborate, tetrabutylammonium tetrafluoroborate, tetrahexylammonium tetrafluoroborate, tetrabutylphosphonium tetrafluoro-borate, trihexyltetradecylphosphonium tetrafluoroborate, 1-butyl-3-methylimidazolium thiocyanate, 1-ethyl-3-methylimidazolium thiocyanate, tetrapentylammonium thiocyanate, trioctylmethylammonium thiosalicylate, 1-butyl-3-methylimidazolium tosylate, 1-ethyl-3-methylimidazolium tosylate, tetrabutylphosphonium tosylate, triisobutylmethylphosphonium tosylate, 3-(triphenylphosphonio)propane-1-sulphonic acid tosylate, tetraethylammonium trifluoroacetate, 4-(3-butyl-1-imidazolio)butane-1-sulphonic acid trifluoromethane-sulphonate, 1-butyl-3-methylimidazolium trifluoromethanesulphonate, 1-ethyl-2,3-dimethylimidazolium trifluoromethanesulphonate, 1-ethyl-3-methylimidazolium trifluoromethanesulphonate, 1-hexyl-3-methylimidazolium trifluoromethanesulphonate, 1-methyl-3-octylimidazolium trifluoromethanesulphonate, tetraethylammonium trifluoromethanesulphonate, 1,2,3-trimethylimidazolium trifluoromethanesulphonate, 1-hydroxyethyl-3-methylimidazolium 2-(2-methoxyethoxy)ethylsulphate, 1-hydroxyethyl-3-methylimidazolium acetate, 1-hydroxyethyl-3-methylimidazolium trifluoroacetate, 1-hydroxyethyl-3-methylimidazolium bis(trifluoromethylsulphonyl)imide, 1-hydroxyethyl-3-methylimidazolium bromide, 1-hydroxyethyl-3-methylimidazolium chloride, 1-hydroxyethyl-3-methylimidazolium decanoate, 1-hydroxyethyl-3-methylimidazolium dicyanamide, 1-hydroxyethyl-3-methylimidazolium hexafluorophosphate, 1-hydroxyethyl-3-methylimidazolium hydrogensulphate, 1-hydroxyethyl-3-methylimidazolium iodide, 1-hydroxyethyl-3-methylimidazolium methanesulphonate, 1-hydroxyethyl-3-methylimidazolium methylsulphate, 1-hydroxyethyl-3-methylimidazolium ethylsulphate, 1-hydroxyethyl-3-methylimidazolium nitrate, 1-hydroxyethyl-3-methylimidazolium phosphate, 1-hydroxyethyl-3-methylimidazolium octylsulphate, 1-hydroxyethyl-3-methylimidazolium tetrachloroaluminate, 1-hydroxyethyl-3-methylimidazolium tetrafluoroborate, 1-hydroxyethyl-3-methylimidazolium thiocyanate, 1-hydroxyethyl-3-methylimidazolium salicylate, 1-hydroxyethyl-3-methylimidazolium thiosalicylate, 1-hydroxyethyl-3-methylimidazolium tosylate, 1-hydroxyethyl-3-methylimidazolium trifluoromethanesulphonate, 1-hydroxyethyl-3-methylimidazolium lactate, 1-hydroxyethyl-3-methylimidazolium glycolate, 1-hydroxyethyl-3-methylimidazolium citrate, 1-hydroxyethyl-3-methylimidazolium oxalate, 1-hydroxyethyl-3-methylimidazolium tartrate, bis(hydroxyethyl)dimethylammonium acetate, bis(hydroxyethyl)dimethylammonium trifluoroacetate, bis(hydroxyethyl)dimethylammonium bis(trifluoromethylsulphonyl)imide, bis(hydroxyethyl)-dimethylammonium bromide, bis(hydroxyethyl)dimethyl-ammonium chloride, bis(hydroxyethyl)dimethylammonium decanoate, bis(hydroxyethyl)dimethylammonium dicyanamide, bis(hydroxyethyl)dimethylammonium hexafluorophosphate, bis(hydroxyethyl)dimethylammonium hydrogensulphate, bis(hydroxyethyl)dimethylammonium iodide, bis(hydroxyethyl)dimethylammonium methanesulphonate, bis(hydroxyethyl)dimethylammonium methylsulphate, bis(hydroxyethyl)dimethylammonium ethylsulphate, bis(hydroxyethyl)dimethylammonium nitrate, bis(hydroxyethyl)dimethylammonium phosphate, bis(hydroxyethyl)dimethylammonium octylsulphate, bis(hydroxyethyl)dimethylammonium tetrachloroaluminate, bis(hydroxyethyl)dimethylammonium tetrafluoroborate, bis(hydroxyethyl)dimethylammonium thiocyanate, bis(hydroxyethyl)dimethylammonium salicylate, bis(hydroxyethyl)dimethylammonium thiosalicylate, bis(hydroxyethyl)dimethylammonium tosylate, bis(hydroxyethyl)dimethylammonium trifluoromethanesulphonate, bis(hydroxyethyl)dimethylammonium lactate, bis(hydroxyethyl)dimethylammonium glycolate, bis(hydroxyethyl)dimethylammonium citrate, bis(hydroxyethyl)dimethylammonium oxalate, bis(hydroxyethyl)dimethylammonium tartrate.

In a further preferred embodiment of the invention, use is made of ionic liquids or mixtures thereof which contain a combination of a 1,3-dialkylimidazolium, 1,2,3-trialkylimidazolium, 1,3-dialkylimidazolinium and 1,2,3-trialkylimidazolinium cation with an anion selected from the group consisting of halides, bis(trifluoromethylylsulphonyl)imide, perfluoroalkyltosylates, alkylsulphates and alkylsulphonates, perfluorinated alkylsulphonates and alkylsulphates, perfluoroalkylcarboxylates, perchlorate, dicyanamide, thiocyanate, isothiocyanate, tetraphenyl-borate, tetrakis(pentafluorophenyl)borate, tetrafluoro-borate, hexafluorophosphate.

Furthermore, it is also possible to use simple, commercially available, acyclic quaternary ammonium salts such as TEGO® IL T16ES, TEGO® IL K5MS, TEGO® IL DS or TEGO® IL 2MS (products of Evonik Goldschmidt GmbH).

In light of the state of the art, it was surprising to discover that particularly antifoams which have been developed for defoaming surfactant-stabilized aqueous systems also have a good antifoaming effect in water-free (or low-water) ionic liquids and thus achieve the object of the invention.

For the purposes of the present invention, antifoams generally comprise hydrophobic oils which are insoluble in water under use conditions or finely divided, hydrophobic solids, which means an average particle size of about 0.1 to 100 µm.

The oils can contain finely divided, hydrophobic particles to improve their action. Such hydrophobic solids, oils or dispersions of particles in oils can be modified by blending with additives (e.g. emulsifiers) so that they can readily be emulsified with little shear in aqueous applications. If appropriate, these oils or dispersions can also be formulated directly to form aqueous emulsions, with customary additives (emulsifiers, thickeners, protective colloids, preservatives) and homogenization techniques for emulsion production being able to be used.

Examples of hydrophobic oils which are used in antifoam formulations for aqueous systems are mineral oils (A), vegetable oils (B), silicone oils (C), polyoxyalkylenes (D), modified polysiloxanes (E) and mixtures of these components.

Examples of hydrophobic inorganic solids are optionally hydrophobicized silica (F), aluminium oxide, alkaline earth metal carbonates or the like, finely divided solids which are known and customary in the prior art. Organic hydrophobic substances are alkaline eath metal salts of long-chain fatty acids having from 12 to 22 carbon atoms which are known for this purpose, the amides of such fatty acids, polyureas (G) and waxes (H) and also mixtures of these solids.

The mineral oils (A) can be, in particular, fuel oils, mineral sealing oils, naphthene oils and paraffin oils.

The vegetable oils (B) can be, in particular, rapeseed oil, castor oil, soybean oil, linseed oil, sunflower oil and tall oil.

The silicone oils (C) can be linear or branched polysiloxanes which have methyl and/or hydroxyl end groups and preferably have a viscosity of >50 mPas, particularly preferably a viscosity in the range from 100 mPas to 10 000 mPas measured at 25° C.

The polyoxyalkylenes (D) can have the general formula (D-1):

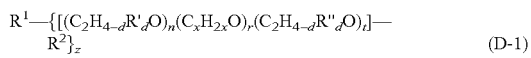

(D-1)

where $R^1$ corresponds to the radical of an alcohol, polyetherol or phenol $R^1$—H (the H belongs to the OH group of the alcohol or phenol). $R^1$—H is preferably a monohydric or polyhydric polyether alcohol or alcohol having a molar mass of preferably from 18 to 2000 g/mol and having from 1 to 8, preferably from 1 to 4, hydroxyl groups. Examples which may be mentioned are allyl alcohol, butanol, octanol, dodecanol, stearyl alcohol, 2-ethylhexanol, cyclohexanol, benzyl alcohol, ethylene glycol, propylene glycol, diethylene, triethylene and polyethylene glycols, 1,2-propylene glycol, dipropylene and polypropylene glycols, 1,4-butanediol, 1,6-hexanediol, trimethylolpropane, glycerol, pentaerythritol, sorbitol or hydroxyl-containing compounds based on natural materials.

Furthermore, d is from 1 to 3, $n \geq 0$, x is from 2 to 10, preferably from 2.5 to 4, $r \geq 0$ and is preferably from 5 to 350, $t \geq 0$, $n+r+t \geq 1$, z is from 1 to 8, preferably from 1 to 4, particularly preferably 1 or 2, and R' is a monovalent aromatic, unsubstituted or substituted hydrocarbon radical, R" is hydrogen or a monovalent hydrocarbon radical having from 1 to 18 carbon atoms, $R^2$ is an H atom, a monovalent organic linear or branched alkyl radical having from 1 to 40 carbon atoms or a carboxy radical of a branched or unbranched alkyl or aryl ester.

The compounds can be present either as pure compounds or in a statistical mixture with one another, with the numerical values indicated in the formulae corresponding to the mean of the statistical distribution of the value of the indices.

Suitable polysiloxanes (E) are described, for example, in DE 10353856 (US 2005107523) and DE 2829906 (U.S. Pat. No. 4,274,977), whose disclosure content is hereby fully incorporated by reference into the present disclosure. These can have the following structure (E-1),

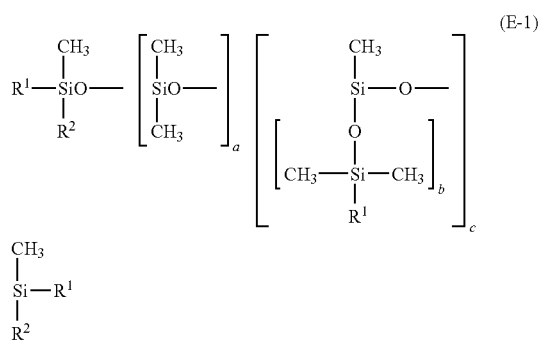

(E-1)

where the radicals $R^1$ in the average molecule can be identical or different and are each a possibly —OH— functional hydrocarbon radical which has from 1 to 14 carbon atoms and may contain double bonds or a radical —O—R* where R* is an alkyl radical having 1, 2, 3 or 4 carbon atoms or the radical —Z—$(C_nH_{2n}$—$O)_m$R', where R' is hydrogen or an alkyl radical having from 1 to 8 carbon atoms or acyl, $R^2$ is phenyl, ethyl, methyl, hydroxyl, amine with at least 90% methyl, Z is a divalent radical of the formula —O—, —NH—, —$NR^3$— where $R^3$=$C_{1-4}$-alkyl radical, —S—, —$(CH_2)_p$—O— or —$CH_2$—$CH(CH_3)$—$CH_2$—O— where p=2, 3, 4, n has an average numerical value of from >2.5 to 4.0, m has an average numerical value of from 5 to 350, a has an average numerical value of from 4 to 1500, b has an average numerical value of from 0 to 100, c has an average numerical value of from 0 to 100.

Further suitable modified polysiloxanes have structures of the formula (E-2)

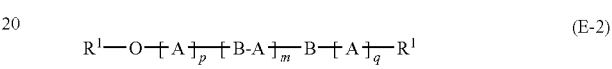

(E-2)

where the radical A is a polyoxyalkylene block of the average formula (E-2a),

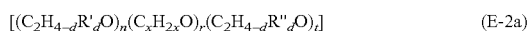

(E-2a)

where d is from 1 to 3, $n \geq 0$, x is from 2 to 10, $r \geq 0$, $t \geq 0$, $n+r+t \geq 1$, and R' is a monovalent aromatic, substituted or unsubstituted hydrocarbon radical, R" is hydrogen or a monovalent hydrocarbon radical having from 1 to 18 carbon atoms, $R^1$ is an H atom, a monovalent organic linear or branched alkyl radical having from 1 to 40 carbon atoms or a carboxy radical of a branched or unbranched alkyl or aryl ester, B is a polysiloxane block of the average formula (E-2b),

(E-2b)

where the radicals $R^2$ are identical or different and are each an alkyl radical having from 1 to 4 carbon atoms or a phenyl radical and y is from 5 to 200, m is from 2 to 100, p is 0 or 1 and q is 0 or 1.

Additional suitable modified polysiloxanes have structures of the formula (E-3)

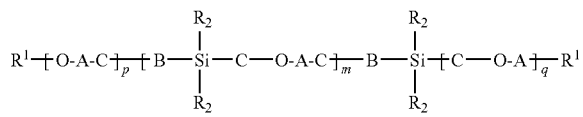

(E-3)

where the radicals
R¹, A, B and m, p and q are as defined above in the case of structure (E-2) and
C is a linear or branched alkylene radical having from 2 to 20 carbon atoms.

The compounds can be present either as pure compounds or in a statistical mixture with one another, with the numerical values indicated in the formulae corresponding to the mean of the statistical distribution of the value of the indices.

Examples of urea derivatives (G) are described in DE 3245482 (U.S. Pat. No. 4,696,761) and DE 19917186 (U.S. Pat. No. 6,420,324). DE 19917186 indicates the general formula (G-1):

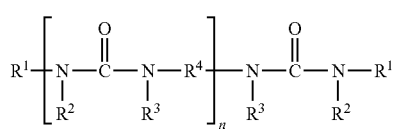

(G-1)

where $R^1$ is a hydrocarbon radical having from 4 to 30 carbon atoms or a hydrocarbon radical having from 4 to 24 carbon atoms and a nitrogen atom or a hydrocarbon radical having from 4 to 30 carbon atoms and a carbonyl group,
$R^2$ is a hydrogen atom or a hydrocarbon radical having from 1 to 24 carbon atoms,
$R^3$ is a hydrogen atom or a hydrocarbon radical having from 1 to 24 carbon atoms,
$R^4$ is an organic radical having from 2 to 30 carbon atoms and n=0 to 5.

Examples of waxes (H) are polyethylene waxes, polyamide waxes and mixtures thereof having a melting or softening point above the use temperature.

The compositions of the invention contain from 80 to 99.999% by weight, preferably from 90 to 99.999% by weight, in particular at least 95% by weight and particularly preferably from >98 to 99.999% by weight, of one or more ionic liquids,
and from 0 to 20% by weight, preferably from 0 to 10% by weight and particularly preferably from 0 to 5% by weight, of solvents,
and from 0 to 20% by weight, preferably from 0 to 10% by weight and particularly preferably from 0 to 5% by weight, of auxiliaries and additives,
and from 0.001 to 10% by weight, preferably from 0.001 to 5% by weight and particularly preferably from 0.05 to 1% by weight, of one or more antifoams according to the invention, where the sum of all components of the composition adds up to 100% by weight.

In another embodiment of the invention, the amount of decrease in the foam height for the compositions of the invention relative to the foam height for a composition in the absence of antifoam is about 10% to about 45%.

In another embodiment of the invention, the amount of decrease in the foam height for the compositions of the invention relative to a standard initial foam height is selected from a range consisting of about 0% to about 25%, from about 25% to about 50% and from more than 50%.

The antifoams and compositions of the invention together with ionic liquids and their use are described by way of example below, without the invention being restricted to these illustrative embodiments.

Where ranges, general formulae or classes of compounds are indicated below, these are intended to encompass not only the ranges or groups of compounds which are specifically mentioned but also all subranges and subgroups of compounds which can be obtained by leaving out individual values (ranges) or compounds. Where documents are cited in the present description, their contents are fully incorporated by reference into the disclosure content of the present invention.

EXAMPLES

The present invention is illustrated by way of example in the examples described below without the invention, whose scope is given by the entire description and the claims, being restricted to the embodiments presented in the examples.

Table 1 below shows, by way of example, the basis of the active ingredients of commercially available products for defoaming aqueous systems.

| Product | Hydrophobic oil | Hydrophobic particles |
|---|---|---|
| Rapeseed oil | B | — |
| Tegiloxan ® 1000 | C | — |
| TEGO ® Antifoam 2290 | A | H |
| TEGO ® Antifoam 3062 | E | F |
| TEGO ® Antifoam 7001 XP | E | F |
| TEGO ® Antifoam 793 | E | F |
| TEGO ® Antifoam KS 53 | B | F |
| TEGO ® Antifoam KE 600 | D | F |
| TEGO ® Antifoam KS 6 | A | F |
| TEGO ® Antifoam KS 911 | D | — |
| TEGO ® Antifoam MR 1015 | E | F |
| TEGO ® Antifoam MR 2101 | E | G |
| TEGO ® Antifoam MR 465 | E | — |
| TEGO ® Antifoam N | C | F |
| Tegopren ® 3158 | E | — |
| Tegopren ® 5851 | E | — |
| Paraffinic white oil | A | — |

Testing by Means of ASTM test D 892

The following tests were carried out using the ionic liquids TEGO® IL IM ES (1-methyl-3-ethylimidazolium ethylsulphate) and TEGO® IL T 16 ES (ethylbis(polyethoxy(8)ethyl)tallowammonium ethylsulphate).

The antifoaming effect was tested in a manner analogous to ASTM test D 892 at room temperature. For this purpose, 200 ml of the ionic liquid to be defoamed was introduced into a measuring cylinder of the ASTM apparatus and the cylinder was closed with a rubber stopper which has a hole through which the air introduction rod was passed and to which the measurement body was affixed. A defined amount of gas ($N_2$ gas, compressed air or ambient air, if appropriate generated by means of an aquarium pump) (90 ml/min) was passed through the liquid and foam was produced. It had to be ensured that the measurement body hangs centrally in the cylinder. After 5 minutes, the foam height was determined and the antifoam was introduced by means of a pipette. The collapse of the foam was observed and the antifoaming effect was assessed after a further 5 minutes. The antifoaming effect was assessed according to a scale of grades, as follows:

grade 1: foam ring up to a maximum of 50 ml of foam
grade 2: 50 ml-100 ml of foam
grade 3: 100 ml-max. of foam Table 2 below summarizes the results of the tests.

|  | Fresh values | | 4 Weeks storage | |
| --- | --- | --- | --- | --- |
|  | TEGO ® IL IM ES | TEGO ® IL T 16 ES | TEGO ® IL IM ES | TEGO ® IL T 16 ES |
| Blank (without antifoam) | 3 | 3 | 3 | 3 |
| TEGO ® Antifoam MR 1015 | 1 | 1 | 1 | 1 |
| Rapeseed oil |  | 1 |  |  |
| TEGO ® Antifoam 793 | 1 | 1 | 1 | 1 |
| TEGO ® Antifoam 7001 XP | 1 | 1 | 1 | 1 |
| TEGOPREN ® 3158 | 1 | 2 | 1 | 2 |
| Tegiloxan ® 1000 | 1 | 1 | 1 | 1 |
| TEGO ® Antifoam KE 600 | 1 | 1 | 1 | 1 |
| TEGO ® Antifoam KS 6 | 1 | 1 | 1 | 1 |
| TEGO ® Antifoam 2290 | 1 | 1 | 1 | 1 |
| TEGO ® Antifoam 911 | 3 | 1 | 3 | 1 |
| TEGO ® Antifoam MR 465 | 3 | 1 | 3 | 1 |
| TEGO ® Antifoam 3062 | 1 | 1 | 1 | 1 |
| TEGO ® Antifoam N | 1 | 2 | 1 | 2 |
| White oil (viscosity = 25 mPas) |  | 1 |  |  |

|  | Fresh values Addition of 5% of $H_2O$ | | 4 Weeks storage Addition of 10% of $H_2O$ | |
| --- | --- | --- | --- | --- |
|  | TEGO ® IL IM ES | TEGO ® IL T 16 ES | TEGO ® IL IM ES | TEGO ® IL T 16 ES |
| Blank (without antifoam) | 3 | 3 | 3 | 3 |
| TEGO ® Antifoam MR 1015 | 1 | 1 | 1 | 1 |
| TEGO ® Antifoam 793 | 1 | 1 | 1 | 1 |
| TEGO ® Antifoam 7001 XP |  |  |  |  |
| TEGOPREN ® 3158 |  |  |  |  |
| Tegiloxan ® 1000 | 2 | 1 | 2 | 2 |
| TEGO ® Antifoam KE 600 |  |  |  |  |
| TEGO ® Antifoam KS 6 | 2 | 1 | 2 | 1 |
| TEGO ® Antifoam 2290 |  |  |  |  |
| TEGO ® Antifoam 911 |  |  |  |  |
| TEGO ® Antifoam 465 |  |  |  |  |
| TEGO ® Antifoam 3062 |  |  |  |  |
| TEGO ® Antifoam N | 1 | 1 | 1 | 1 |

Table 2 shows that a better grade (1-2) than in the case of the blank (3) can be achieved throughout by use of the antifoam components.

The antifoaming effect can still be seen even when the ionic liquid contains water which is present as impurity and/or can be formed in industrial processes.

Test Having Mechanical Foam Instrument (DIN 53902/1)

The following tests were carried out using the ionic liquid Rewoquat® W 18 (dinortallowcarboxyethyl)hydroxy-ethyl-methylammonium methylsulphate).

The trial was carried out in a 6-cylinder mechanical foam instrument (DIN 53902/1).

The individual cylinders of the instrument are equipped with plungers made of perforated metal sheet which can be sent into rapid up and down motion during operation. An ml scale which enables the fill height to be read off before and after the test is provided on the outside of the cylinder. The number of "strokes" can be set individually. The experiment was carried out at a temperature of 60° C. (cylinders are surrounded by flowing water and heating can be provided by means of a thermostat). The test substances were brought to 60° C. and introduced into the cylinders. The cylinders were filled to the 250 ml mark with product and the fill levels were read off after 100 strokes of the plunger. The increase in the volume over 250 ml is caused by formation of foam due to the air introduced.

Two trials were carried out. In trial I, a sample containing pure ionic liquid Rewoquat W 18 and also 4 samples each containing 0.01% by weight of different antifoams according to the invention were examined. In a second experiment, a sample containing pure ionic liquid Rewoquat® W 18 was tested together with 4 samples in which the amount of antifoam was increased to 0.05% by weight. The results are summarized in Table 3 below.

| Ionic liquid: Rewoquat ® W 18 Antifoam | Fill height after 100 strokes (initial height: 250 ml) Trial I (use of 0.01% of antifoam) |
| --- | --- |
| Blank (no antifoam) | 320 ml |
| TEGO ® Antifoam 793 | 260 ml |
| TEGO ® Antifoam 7001 XP | 260 ml |
| TEGOPREN ® 5851 | 280 ml |
| TEGO ® Antifoam MR 465 | 280 ml |

It can be seen that even an addition of only 0.01% by weight of antifoam results in a clear reduction in foaming compared to the blank.

An increase in the amount of antifoam to 0.05% by weight may enable the effect to be increased further; in the case of TEGO® Antifoam 7001 XP, a foam height of only 250 ml was found.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:

1. A method of defoaming a composition containing at least 80% by weight of one or more ionic liquids and, optionally, a solvent and/or further auxiliaries or additives, the composition being free of ketone residues, ketone-aldehyde resins, and/or urea-aldehyde resins and/or their hydrogenated derivatives, the method comprising:
adding a polyether siloxane antifoam to said composition.

2. The method according to claim 1;
wherein the antifoam contains finely divided, hydrophobic particles.

3. The method according to claim 1;
wherein the antifoam contains further additives and emulsifiers.

4. The method according to claim 1;
wherein the antifoam has been emulsified in water using a customary additive comprising at least one of an emulsifier, a thickener, a protective colloid, and a preservative.

5. The method according to claim 1;
wherein at least one of an organic solvent water, and a mixture thereof is used as a solvent.

6. The method according to claim 5;
wherein the solvent is an organic solvent.

7. The method according to claim 1,
wherein said polyether siloxane is a compound of the general formula (E-1), (E-2), (E-2a), (E-2b), or (E-3);
wherein formula (E-1) is defined as:

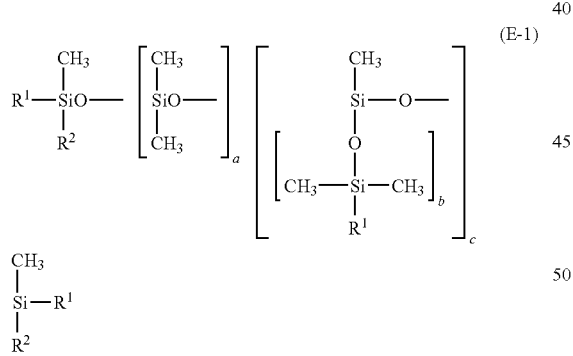

(E-1)

where:
$R^1$ in the average molecule can be identical or different and are each a radical $-Z-(C_nH_{2n}-O)_mR'$, where $R'$ is hydrogen or an alkyl radical having from 1 to 8 carbon atoms or acyl;
$R^2$ is phenyl, ethyl, methyl, hydroxyl, amine with at least 90% methyl;
Z is a divalent radical of the formula $-O-$, $-NH-$, $-NR^3-$ where $R^3=C_{1-4}$-alkyl radical, $-S-$, $-(CH_2)_p-O-$ where $p = 2, 3, 4$, or $-CH_2-CH(CH_3)-CH_2-O-$;
n has an average numerical value of from >2.5 to 4.0;
m has an average numerical value of from 5 to 350;
a has an average numerical value of from 4 to 1500;
b has an average numerical value of from 0 to 100; and
c has an average numerical value of from 0 to 100;
wherein formula (E-2) is defined as:

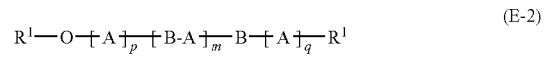

(E-2)

where the radical A is a polyoxyalkylene block of the average formula (E-2a);

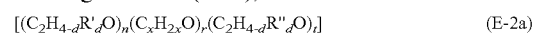

(E-2a)

where:
d is from 1 to 3;
$n \geq 0$;
x is from 2 to 10;
$r \geq 0$;
$t \geq 0$;
$n + r + t \geq 1$;
R' is a monovalent aromatic, substituted or unsubstituted hydrocarbon radical;
R'' is hydrogen or a monovalent hydrocarbon radical having from 1 to 18 carbon atoms; and
$R^1$ is an H atom, a monovalent organic linear or branched alkyl radical having from 1 to 40 carbon atoms or a carboxy radical of a branched or unbranched alkyl or aryl ester;
where the radical B is a polysiloxane block of the average formula (E-2b),

(E-2b)

where:
the radicals $R^2$ are identical or different and are each an alkyl radical having from 1 to 4 carbon atoms or a phenyl radical; and
y is from 5 to 200; and
where:
m is from 2 to 100;
p is 0 or 1; and
q is 0 or 1; and
wherein formula (E-3) is defined as:

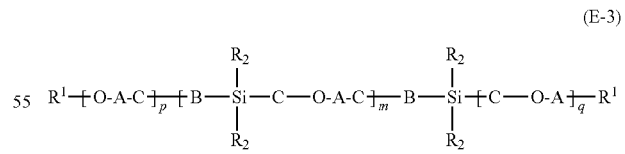

(E-3)

where:
$R^1$, A, B, m, p, and q are as defined above in the case of structure (E-2); and
C is a linear or branched alkylene radical having from 2 to 20 carbon atoms.

8. The method of claim 1, further comprising:
after the polyether siloxane antifoam has been added to the composition to obtain a defoamed composition, performing an additional step of at least one of:

using the defoamed composition as at least one of:
    a lubricant, a hydraulic fluid, a thermal fluid, an electrolyte liquid, an absorbent in an absorption refrigeration process, a cleaning liquid; and
using the defoamed composition in at least one of:
    a separation process, a biorefinery process, a cellulose spinning process and a cellulose derivatization.

9. The method of claim 1;
wherein the composition comprises:
    from 80 to 99.999% by weight of one or more ionic liquids;
    from 0 to 20% by weight of solvents; and
    from 0 to 20% by weight of auxiliaries and additives; and
wherein said polyether siloxane antifoam is added in an amount of from 0.001 to 10% by weight.

10. The method of claim 1;
wherein said one or more ionic liquids are compounds of formula (i):

    (i)

where:
    each radical $R^6$ is independently an alkyl group, or hydroxyalkyl group having from 1 to 6 carbon atoms, or a benzyl group;
    each radical $R^7$ is independently hydrogen, a linear or branched alkyl group having from 11 to 22 carbon atoms, or a linear or branched alkenyl group having from 11 to 22 carbon atoms, with the proviso that at least one radical $R^7$ is not hydrogen;
    Q is selected independently from the one of the formulae —O—C(O)—, —C(O)O, —NR$^8$—C(O)—, —C(O)—NR$^8$—, —O—C(O)—O, —CHR$^9$—O—C(O)— and —CH(OCOR$^7$)—CH$_2$—O—C(O)—;
    where $R^8$ is hydrogen, methyl, ethyl, propyl or butyl; and
    where $R^9$ is hydrogen or methyl; and
    $X^-$ is chloride or methylsulphate.

11. The method of claim 10;
wherein said one or more ionic liquids of formula (i) are selected from the group consisting of:
    N,N-di(tallowyloxyethyl)-N,N-dimethylammonium chloride;
    N,N-di(canolyloxyethyl)-N,N-dimethylammonium chloride;
    N,N-di(tallowyloxyethyl)-N-methyl-N-(2-hydroxyethyl) ammonium methylsulphate;
    N,N-di(canolyloxyethyl)-N-methyl-N-(2-hydroxyethyl) ammonium methylsulphate;
    N,N-di(tallowylamidoethyl)-N-methyl-N-(2-hydroxyethyl) ammonium methylsulphate;
    N,N-di(2-tallowyloxy-2-oxo-ethyl)-N,N-dimethylammonium chloride;
    N,N-di(2-canolyloxy-2-oxo-ethyl)-N,N-dimethylammonium chloride;
    N,N-di(2-tallowyloxyethylcarbonyloxyethyl)-N,N-ditnethylarmmonium chloride;
    N,N-di(2-canolyloxyethylcarbonyloxyethyl)-N,N-dimethylammonium chloride;
    N-(2-tallowoyloxy-2-ethyl)-N-(2-tallowyloxy-2-oxoethyl)-N,N-dimethylammnonium chloride;
    N-(2-canolyloxy-2-ethyl)-N-(2-canolyloxy-2-oxoethyl)-N,N-dimethylammnonium chloride;
    N,N,N-tri(tallowyloxyethyl)-N-methylammonium chloride;
    N,N,N-tri(canolyloxyethyl)-N-methylammonium chloride;
    1,2-ditallowyloxy-3-N,N,N-trimethylammoniopropyl chloride; and
    1,2-dicanolyloxy-3-N,N,N-trimethylammoniopropyl chloride.

\* \* \* \* \*